United States Patent [19]
Thornton et al.

[11] Patent Number: 5,589,027
[45] Date of Patent: Dec. 31, 1996

[54] CUSTOM FABRICATED AND BORDERED RUG AND METHOD AND APPARATUS FOR FORMING IT

[75] Inventors: John Thornton, Chattanooga, Tenn.; Stanton J. Pool, Dalton, Ga.; Dennis R. Doll, Harrison, Tenn.

[73] Assignee: American Rug Craftsmen, Inc., Sugar Valley, Ga.

[21] Appl. No.: 199,057

[22] Filed: Feb. 22, 1994

Related U.S. Application Data

[62] Division of Ser. No. 30,631, Mar. 12, 1993, abandoned.

[51] Int. Cl.⁶ .................................................. B29C 65/00
[52] U.S. Cl. ..................... 156/304.4; 156/304.6; 156/304.7
[58] Field of Search .............................. 156/304.1, 304.3, 156/304.4, 304.6, 304.7, 311, 324, 544, 545, 546

[56] References Cited

U.S. PATENT DOCUMENTS 2,705,693  4/1955  Dildilian et al. ..................... 156/304.4
4,406,719  9/1983  Mitsumoto et al. ....................... 156/52
4,582,554  4/1986  Bell et al. ............................. 156/324 X Primary Examiner—David A. Simmons
Assistant Examiner—J. Sells
Attorney, Agent, or Firm—Wood, Herron & Evans, PLL

[57] ABSTRACT

Bordered and custom fabricated rugs are formed by initially bonding carpet segments together along abutting edges, using a high temperature hot melt adhesive. Preferably a latex coated material is then bonded to the backing of the adjoined carpet segments using a second lower temperature hot melt adhesive. A reinforcing mesh layer is preferably bonded to and between a rug backing and the carpet backing. The apparatus used to bond the rug backing to the carpet backing includes two opposed endless belts, moving along parallel runs at the same speed, which capture the carpet sections and the backing between them and carry the assembly first through a heating section then through a cooling section as pressure is applied to force the carpet segments against the rug backing into engagement with the adhesive. The heating section melts the low temperature adhesive, which then flows under pressure, bonding the segments together. The heating section does not, however, affect the high temperature hot melt adhesive, which holds the carpet segments together during the heating stages and prevents edge separation under pressure. The seams of the resulting rugs are remarkably resistant to separation.

12 Claims, 4 Drawing Sheets

5,589,027

CUSTOM FABRICATED AND BORDERED RUG AND METHOD AND APPARATUS FOR FORMING IT

This application is a divisional application of application Ser. No. 08/030,631 filed Mar. 12, 1993, abandoned.

BACKGROUND OF THE INVENTION

The present invention relates to the manufacture of rugs, and more specifically, to the manufacture of bordered rugs and custom fabricated rugs from separate carpet segments.

Bordered rugs typically have a central segment which is referred to as the field, and a border that surrounds the field. The field itself can be formed of one or more segments of carpeting, although it is generally a single piece. The border for a rectangular field is generally formed from at least four segments of carpeting, each cut to a desired size and shape to surround the field. The field and the border generally have different colors to provide a unique, aesthetic appearance.

Each segment of carpet usually has a so-called "grain," that is, the carpet fibers of the segments all tend to slant in the same direction. Border segments are usually positioned so that their grains all slant toward the field: it is impractical for all the border segments to be cut or arranged so that all of their grain directions will slant in the same direction as the field grain. Thus, at least along one or more edge areas, the grain direction of the border will be opposite that of the field. If downward pressure is applied on a seam between border and field segments where the grains are opposed, the pressure on the oppositely slanting fibers at the seam tends to urge the two segments apart and open up the seam between them. It is therefore important that the seam be strong enough not only to resist separation in use, but also during assembly.

Generally, bordered rugs have been formed by initially preparing the field. The border pieces are cut individually. For a rectangular rug, there will be tour generally elongated border segments, each border segment having two mitered ends to provide a rectangular frame pattern around the field. The segments of carpet are then arranged pile down, edge to edge, and the field and borders are bonded together to form a unitary rug.

There are many ways to bond the segments of carpeting together. They can simply be sewn together, which is extremely labor intensive, or a cold seam tape can be applied at the abutting edges of the carpet segments, or a hot melt seam tape can be applied to bond abutting segments together. This does not add strength to the seams or rug, and the seams are detectable.

Further, previous methods of forming bordered rugs are slow and relatively expensive. The required sequential manual steps significantly increasing the overall cost of the formed rug.

Unfortunately, there are inherent problems in automating the rug process. The segments must be bonded strongly enough to prevent any gaps from opening. The rug may be large and quite heavy; applying the backing material to it requires handling or turning of the rug which can cause the sections to separate during assembly. Also, opposing grain directions can cause the separation of the segments if vertical pressure is applied to the seams between segments prior to final bonding. Further, if seam tape is applied, the tape makes the seam area slightly "higher" than the remaining area of the rug which is undesirable.

SUMMARY OF THE INVENTION

The present invention provides a semi-automated method for making composite rugs such as bordered rugs and custom fabricated rugs which greatly improves the rate of manufacture, yet at the same time provides rugs of greater strength.

In a preferred aspect of the present invention, a rug is assembled by cutting and assembling the respective segments and mechanically holding them together temporarily while spot bonding the segments with a first hot melt adhesive on the abutting seams. A backing material is applied by passing the backing material and the bonded carpet segments between platens under pressure and heat to bond the backing to the carpet segments with a layer of a second hot melt adhesive which has a melting temperature lower than the softening point of the first hot melt adhesive. The first (high temperature) hot melt holds the sections together while the second is melted and cooled, to bond them more completely. This permits continuous travel of the assembled but only partially bonded segments through a press while finally bonding the backing material onto the carpet segments.

In the most preferred embodiment, the backings of the carpet sections are initially bonded together with patches of the higher temperature hot melt adhesive across the seams of adjoining edges at regular intervals. In order to assure that the carpet segments remain adjoined together during handling in preparation for applying the backing material, additional hot melt adhesive is applied along abutting seams. This additional hot melt adhesive is a lower melting point adhesive, and may be significantly less expensive than the first high temperature hot melt adhesive. It keeps the segments together during further handling before entering the press, with relatively low material cost. The adjoined carpet segments are then bonded in a press to a rug backing with an overall layer of hot melt adhesive, applied across the entire backing surface.

The rug backing material is preferably an open weave mesh material having a continuous, impervious coating such as a latex rubber coating. Preferably a reinforcing mesh material is interleaved and bonded between the rug backing material and the carpet segments to provide added strength.

In a preferred embodiment, the rug backing is laminated to the carpet segments by passing the temporarily bonded carpet segments and the rug backing together as a "sandwich" between parallel platens under heat and pressure. At least one of the platens is heated and acts to melt the low temperature hot melt adhesive, both the adhesive on the backing and the adhesive strip along the seams. In a subsequent section, the composite is cooled while still under pressure by passing it between the parallel platens in a zone in which at least one of them is cooled. The heat and pressure forces the adhesive to melt and flow into intimate engagement with the carpet and rug backings, and the reinforcing layer; the cooling bonds the composite together.

In order to prevent friction and/or pressure from moving the segments apart during their passage between the platens, the composite is captured and separated from the upper and lower metal plates by endless upper and lower Teflon coated fiberglass belts which move with the rug through this lamination process.

Using a higher temperature hot melt adhesive to initially bond the carpet segments together permits the automated application of the backing material with a lower temperature hot melt adhesive. When running the assembly through the press, the temperature of the press does not affect the high temperature hot melt adhesive sufficiently to permit the segments (even those with opposed grain) to separate under the bonding pressure. Therefore, even though there may be opposed grain directions in adjacent carpet segments, the high temperature hot melt adhesive holds the segments together as the low temperature adhesive flows through the reinforcing mesh, contacts and bonds the carpet backing as well as to the rug backing.

Further, as indicated, bonding the composite with a moving belt or automated press significantly reduces labor, and provides a very high strength composite rug which will not delaminate during use or permit formation of gaps along adjoining seams in use.

The objects and advantages of the present invention will be further appreciated in light of the following detailed description and drawings in which:

BRIEF DESCRIPTION OF THE DRAWINGS

FIG. 9 is an enlargement of the heating section of the apparatus shown in FIG. 8.

Detailed Description

Figure 1:
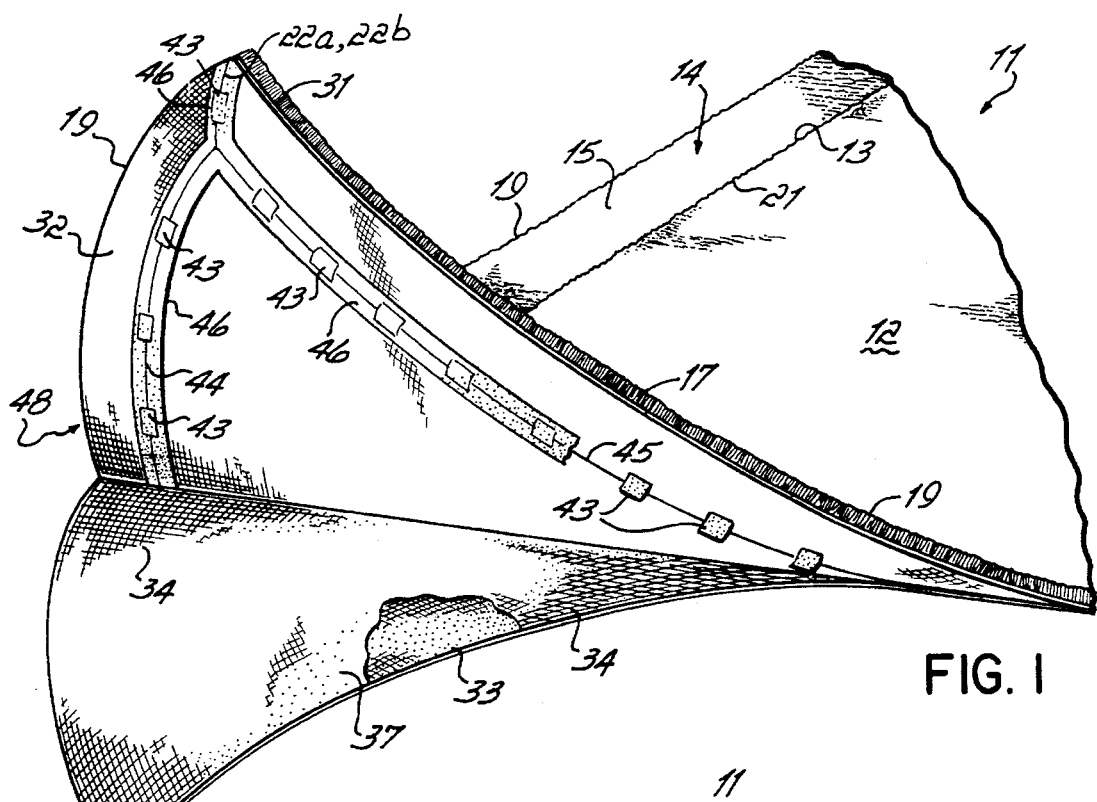
FIG. 1 is a diagrammatic depiction of a preferred form of rug made according to the present invention.
Figure 2:
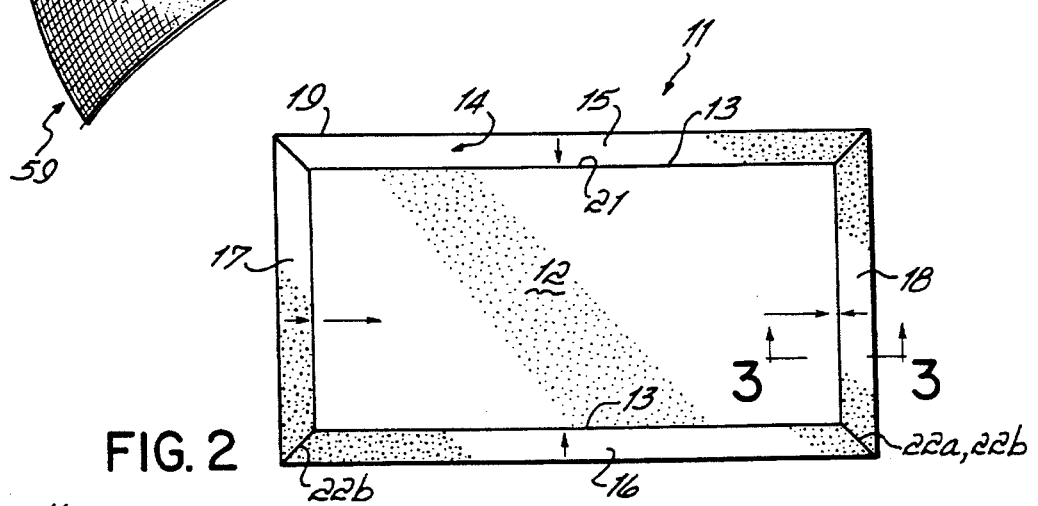
FIG. 2 is a diagrammatic plan view of a rug made according to the present invention.

As shown in FIGS. 1 and 2, a bordered rug 11 according to the present invention includes a central field segment 12 which has a peripheral edge 13. Bonded to and surrounding the peripheral edge 13 of the field segment 12 is a border 14 which includes the side segments 15 and 16, and end segments 17 and 18. Field 12 may be rectangular and each one of the border segments 15, 16, 17, and 18 an elongated, narrow section having an outside edge 19 and inside edge 21 that abuts the peripheral edge 13 of the field. At the corners the border sections 15–18 may (but need not necessarily) have mitered edges 22a and 22b (FIG. 2). It should be understood, however, that the particular design of the rug 11 shown is for illustrative purposes only, and that the invention is useful with a variety of other shapes. Instead of forming a bordered rug, the present invention is equally suitable for bonding two or more carpet segments to form a custom fabricated rug.

The field 12 and the borders 15–18 are all formed from segments of carpet and the field segment, of course, usually has a contrasting color, design, and/or pattern from the border segments.

Figure 3:
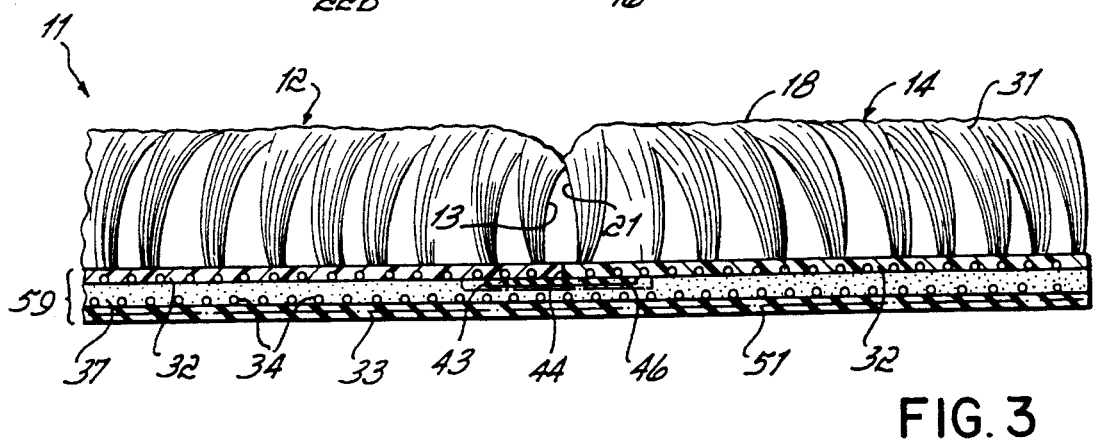
FIG. 3 is an enlarged cross-section taken at line 3—3 of FIG. 2.

As shown more particularly in FIG. 1 and 3, the preferred composite bordered rug 11 includes a pile upper surface 31 on a carpet backing 32 formed, in known manner. Carpet backing 32 is in turn bonded to a rug backing material 33. Between the carpet backing 32 and the rug backing 33 is a reinforcing mesh 34. All three layers 32, 33, and 34 are bonded together by a hot melt adhesive layer 37 which extends from the rug backing 33 through the reinforcing mesh 34 to the carpet material 32.

Figure 6:
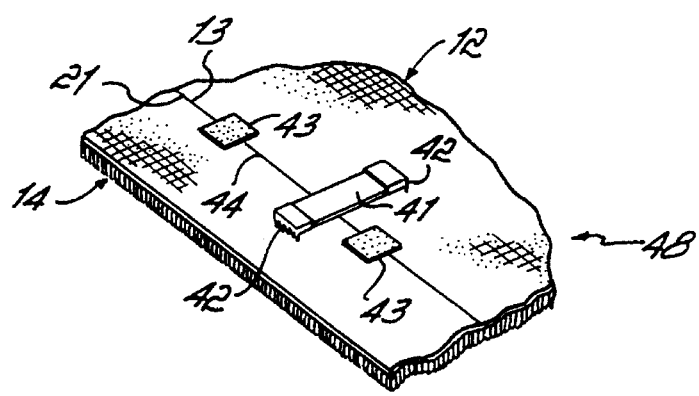
FIG. 6 is a fragmented perspective view of a preferred assembly step useful for the manufacture of rugs according to the method of the present invention.

The rug 11 is formed by initially shaping the field segment 12 as well as the four border segments 15–18 to the desired size and then physically placing these together with their pile side down in edge abutting relationship so that the inside edges 21 of the border segments 15–18 abut and surround the peripheral edge 13 of the field 12. As shown in FIG. 6, the carpet segments may be temporarily held together with elastic straps 41 which have toothed claws 42 at either end which engage and grasp the backing of the carpet segments pulling them together.

Adjacent segments 12 and 14 are partially bonded together by applying patches or spots 43 of a first, high temperature hot melt adhesive 43 along the abutting seams 44 between the field 12 and the border segments 15–18 as well as on the seams between the mitered edges 22a and 22b of the border segments (see FIG. 1). The high temperature hot melt adhesive 43 can be applied as a continuous strip along the entire seam, however, because of its high cost, it is preferably applied as discrete patches 43, for example about 0.5 to 1.5 inches in length and width. Adjacent patches are separated by a spacing preferably of about 6 to 12 inches.

After the patches 43 have hardened (cooled or set), the elastic straps 41 are removed and the seams 44 and 45 are preferably further adhered with a strip 46 of an additional hot melt adhesive which has a melting temperature lower than the melting temperature of the patches of the high temperature first hot melt adhesive 43.

For purposes of the present invention, the first (higher temperature) hot melt adhesive 43 preferably does not soften at the ring and ball temperature of the lower temperature hot melt adhesive 46. A polyamide hot melt adhesive such as Hysol brand 7393 is preferred as the first (high temperature activated) adhesive, although other adhesives may be used. Preferably the softening point of the high temperature hot melt adhesive is greater than 290° F. and preferably 350° F. or higher; and it has a melting temperature of 400° F. or higher.

The low temperature second hot melt adhesive 46 is preferably an ethylene vinyl acetate. This has a ring and ball temperature which is below the softening temperature of the high temperature adhesive and preferably is about 225° F. A preferred type of lower temperature hot melt adhesive is HM4501 sold by Mydrin Inc. of Calhoun, Ga.

A strip about one inch wide of the low temperature hot melt adhesive 46 is applied along each abutting seam 44, 45. This, adhesive further holds the adjoined carpet segments together while the assembly is turned over and positioned for further bonding.

The adjoined carpet segments 48 are then bonded to the rug backing material 33, using a low temperature hot melt adhesive 37. The low temperature hot melt adhesive 46 has a ring and ball temperature lower than the softening point of the high temperature hot melt adhesive 48. Preferably it is the same low temperature hot melt adhesive used to bond the carpet segments together initially along strips 46.

The rug backing material 33 can be any backing material which is strong enough to hold the carpet segments together.

Suitable backing materials include so called "Action Bac"™ open mesh backing sold by Patchogue (Amoco), jute backing, monk's cloth or synthetic monk's cloth.

For purposes of the present invention, the backing material 33 is preferably coated with an impervious layer such as a latex, in order to confine the hot melt coating 37 to its top surface. Such a backing 33 can be formed by applying a liquid latex onto a mesh material. Preferably this mesh material is a relatively open weave mesh having a density of about 3–5 oz/yd$^2$. One preferred material is "Action Bac" brand style 3808 from Patchoque (Amoco). This is a Leno Weave material which is 100% polypropylene. Its density is 4.15 oz/yd$^2$. Preferably its mesh size is sufficiently small (e.g., 18×13) to prevent the latex from passing through it.

A preferred latex material is synthetic rubber latex such as carboxylated styrene butadiene copolymer latex such as Tylac brand sold by Reichold Chemicals. However, there are many other suitable materials which can be used.

Figure 4:
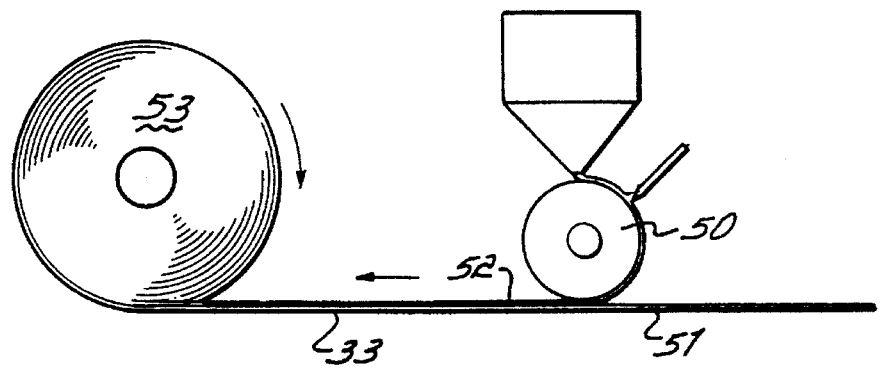
FIG. 4 is a diagrammatic depiction of the preferred manufacture of the rug backing used in the present invention.

As shown in FIG. 4, the coating on the rug backing 33 is formed by coating the open weave mesh material 51 with a liquid latex material 52 using a knife roll coater 50 or other coating apparatus. The latex material 52 is applied so as to have a density of 15–16 oz/yd$^2$ dry weight. The latex closes the meshes of the material 51, and remains primarily on the top surface; it need not substantially pass through to the lower side, though small "bumps" projecting through provide a desirable anti-slip surface on the bottom. The latex provides a Continuous layer which prevents the subsequently applied hot melt from passing through the mesh. The latex backing composite may be either immediately used or stored in a roll 53 for subsequent use.

Figure 5:
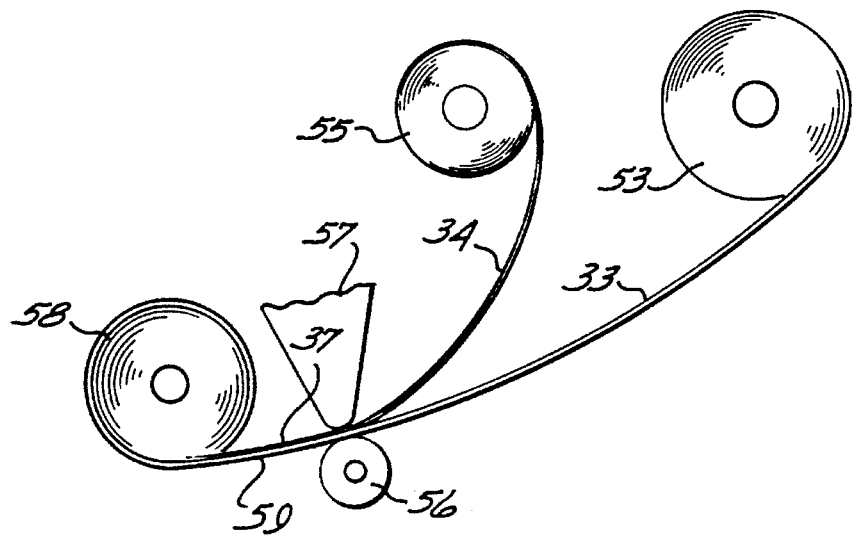
FIG. 5 is a diagrammatic depiction of the preferred method of bonding mesh reinforcement to the rug backing used in the present invention.

As shown in FIG. 5, hot melt adhesive layer 37 and reinforcing mesh layer 34 are next laminated or applied to the rug backing material 33. The intervening mesh material 34 is preferably an open weave polypropylene material having a density of about 1.5 to 2.5 oz/yd$^2$. One preferred material is Action Bac 3824. This is also a Leno Weave material, 100% polypropylene with a 16×6 construction. Its density is 2.24 oz/yd$^2$. Preferably it has larger mesh openings than the rug backing in order to permit the adhesive to pass easily through it. Other reinforcing materials can be used or, in the alternative, it can be omitted entirely, but with loss of strength.

As shown diagrammatically in FIG. 5, this mesh 34 is bonded to the rug backing 33 by a continuous layer of a second hot melt adhesive 37. The backing 33 and the mesh are fed at equal speeds from rolls 53 and 55 and pass between a roller 56 and a slot die adhesive applicator 57. The slot die 57 applies about 24 mils of adhesive 37 across the width of the secondary backing bonding the mesh 34 to the backing 33. The adhesive 37 cools but remains flexible and the mesh reinforced backing may be wound up in a roll 58 and stored until used.

The hot melt adhesive 37 is again a low temperature hot melt adhesive which has a ring and ball temperature lower than the softening temperature of the high temperature hot melt adhesive 43. Preferably, this hot melt adhesive layer 37 is the same low temperature adhesive composition 46 applied along seams 44 and 45 as previously described.

Figure 7:
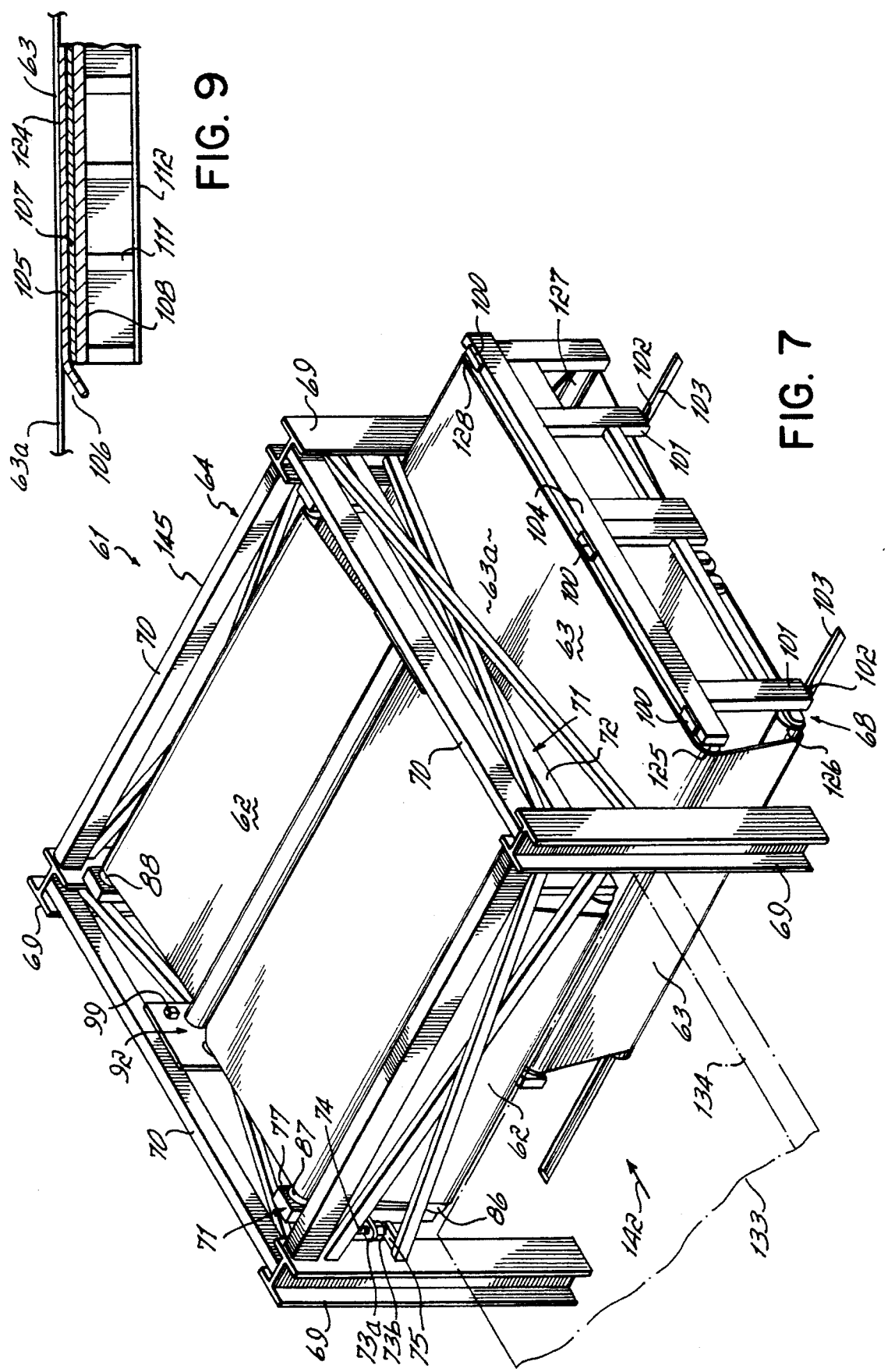
FIG. 7 is a perspective view of the preferred rug bonding apparatus of the present invention.
Figure 8:
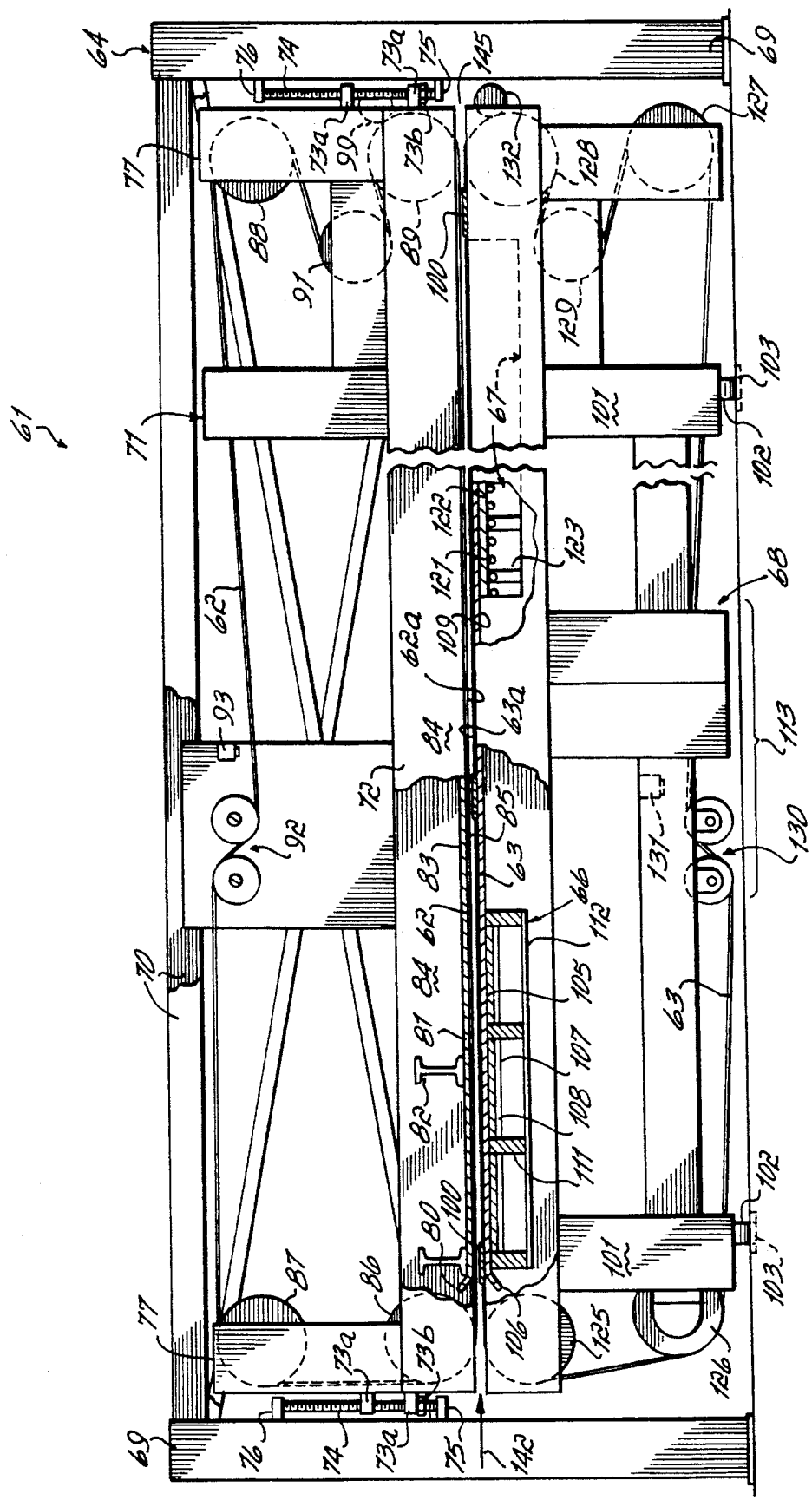
FIG. 8 is an elevation, partially in cross-section, of the apparatus shown in FIG. 7.

The laminating press apparatus 61 for bonding the mesh reinforced composite backing 59 to the adjoined carpet segments 48 is shown in FIGS. 7 and 8. The apparatus 61 includes low friction, "no-stick" (e.g., Teflon coated) fiberglass, upper and lower endless belts 62 and 63. The belts have horizontal, parallel runs 62a, 63a which are closely spaced. The upper belt 62 runs on an upper press frame section 64 which presses upper belt run 62a and carpet captured below it towards the lower belt run 63a, which runs on a lower press section 68 and which includes heating section 66 and cooling section 67.

More specifically, the upper press section 64 includes a supporting frame that includes four beams or legs 69 which in turn are connected by four beams 70 that form a rectangular frame. The legs 69 in turn support an inner belt supporting apparatus 71 which has a rectangular frame 72 supported from the legs 69 at beating blocks 73a and mounted to vertical frame members 77. The bearing blocks 73a in turn are supported by threaded nuts or supports 73b which ride on threaded rods 74 mounted to and rotatable within upper and lower support blocks 75 and 76. This allows the belt supporting apparatus 71 to be raised to allow the lower apparatus to be moved and allows the upper belt to raise or float as a rug passes under it.

The upper apparatus 71 supports a heavy horizontal metal plate or platen 81 which runs the length of the upper apparatus 71. At its forwardmost portion (the right end in FIG. 8), plate 81 has an upper turned edge or lip 80. The metal plate 81 is itself supported by a series of I beams 82 welded to its upper surface 83. The distal ends of I beams 82 are welded to side beams 84 (FIG. 8).

Upper belt 62 passes around three slave rollers 86, 87, 88 and one drive roller 89. There is also a take up roller 91 to maintain tension in the belt as well as a belt guide 92 which maintains belt 62 "on track" on the respective rollers. The belt guide 92 is controlled by a guide eye 93 which automatically adjusts (centers) the run of the belt. A speed sensor 99 measures the speed of the belt 62 at drive roll 89 and is coupled to ensure that the upper and lower belts run at the same speed.

The lower press section 68 is separately moveable from the upper section 64. It includes four support legs 101 which rest on casters 102 which in turn run on transverse metal tracks 103. The legs 101 support an upper frame 104 which in turn supports a metal plate 105. A series of quarter inch thick metal shims 100 (three shown in FIG. 7) support the upper apparatus 71 in use. I beam 82 rests on these shims preventing the upper and lower belts 62 and 63 from resting on each other when no rug is running between this.

Plate 105 itself can be formed from sections that abutted each other. The forwardmost portion of this plate 105 is a downwardly turned edge or lip 106. Immediately downstream of this edge 106 is heating section 66. Heating section 66 is simply a series of strip heaters 107 which rest on a lower metal plate 108 that presses the strip heaters 107 against the bottom surface 109 of metal plate 105 (FIG. 9). As shown in FIG. 9, this lower metal plate 108 is supported by frame members 111. Beneath these frame members is heat insulation board 112. The heating section is as wide as metal plate 105 and about four feet long. Following the heating section is a "dead" or neutral zone 113, about four feet long, where no heat or cooling is applied to the metal surface. Following dead zone 113 is cooling section 67. The cooling section 67 is formed from a series of loops of copper tubing 121 which runs beneath the metal plate 105. The tubing is held in physical contact with the lower surface 109 of metal plate 105 by a second metal plate 122 and in turn is supported by frame members 123. The copper tubing 121 is connected to a chilled water unit (not shown) which provides adequate heat exchange.

The endless lower belt 63 runs on the top surface 124 of the metal plate 105 around three slave rollers 125, 126, 127, and a drive roller 128. There is also a take up roller 129. All these rollers are supported by the frame 104. As with the upper belt, there is a belt guide 130 controlled by a guide eye 131 which maintains the belt in proper alignment on the rollers. Also, as with the upper belt, the lower belt includes a speed sensor 132 which is electronically coupled to the speed sensor 99 on the upper belt to maintain both belts 62, 63 at the same speed. Upstream of apparatus 61 is a table 133 (shown in phantom in FIG. 7) which is used for assembly as is next described.

To laminate the adjoined carpet segments 48 to the mesh reinforced backing 59, a length of the mesh reinforced backing is placed or fed onto the top 134 of the table 133, with the mesh reinforcement 34 and the adhesive layer 37 facing upward and the reinforced latex backing material 33 at the bottom. The adjoined carpet segments 48 are turned pile side up, and are placed on the mesh reinforced backing section 59 with the carpet backing 32 contacting the adhesive layer 37. The edge adhesives 43, 46 hold the segments together and prevent separation during turn over and positioning. The sandwich thus formed is fed into the press apparatus.

The upper and lower belts 62 and 63 move in the direction of arrow 142 and capture the forward edge of the carpet sections 48 and the backing material 59 and carry them together into the apparatus. The rug sandwich assembly is thus captured between the belts as it passes through the press. The belts slide along the platens, and the assembly is held motionless relative to the belts. Speed sensors 99 and 132 will keep the belts 62 and 63 moving at the same speed, preferably about 4 feet per minute. The downwardly and upwardly turned lips of the upper and lower plates will permit the combined carpet and backing, between the respective belts, to be easily fed between the upper and lower plates. Since the belts move at the same speed, there is no friction against the carpet sections or the backing sections tending to pull them apart.

As the carpet 11 assembly moves between the upper and lower metal plates 81, 105, it lifts the floating upper apparatus 71 so that the assembly can pass under it. The weight of upper apparatus 71 applies downward force against the carpet segments pushing them towards the backing material. As the assembly proceeds into the heating section, it is heated to about 290° F. (as measured at the platen surface) to melt the second (low temperature) adhesive, and at the same time roughly about 200 pounds pressure per square foot is applied by the weight of floating upper apparatus 71. The heating section does not melt the patches of the first (high temperature) hot melt. Thus, as shown in FIG. 3, even when the pile fibers of the field and border section are pressed in opposite directions, it still holds the carpet segments together. Although the strip of adhesive 46 is shown separately in this Figure, it actually melts and blends in with adhesive layer 37.

The carpet and backing will next pass through the dead zone to the cooling zone where, as pressure is continually applied, the assembly is cooled to about 160° F. from the bottom side, which causes the adhesive 37 to solidify and bond the carpet backing 32 to the mesh reinforced backing material 59. The continued movement of the upper and lower belts carries the rug through the press and delivers it at the opposite end of the runs.

The rug formed according to the method of the present invention is extremely durable and the sections themselves are prevented from separating under normal conditions. Tests have shown that a rug bonded in this manner can withstand a "pull apart" force across the seam of over 150 pounds per inch, whereas prior rugs of approximately equal grade pull apart less than 75 pounds per inch. Further, the method used to form these rugs is effective in that the edges remain tightly bonded to each other in use; and it is less expensive in that significant labor costs are eliminated. This permits rapid low cost production of an aesthetically appealing and functionally strong and durable bordered rug.

The preceding has been a description of the present invention along with the preferred method of practicing the present invention.

However, the invention itself should be defined only by the appended claims wherein we claim:

1. A method of forming a composite bordered rug comprising:

bonding a plurality of border carpet segments to an edge of a central field carpet segment, each of said border carpet segments and said field segments comprising an upper surface and a carpet backing;

wherein said border carpet segments are bonded to said edge of said field carpet segment by abutting edges of said border carpet segments to said edge of said field carpet segment and applying a first hot-melt adhesive on said carpet backing of adjoining border carpet segments and said field carpet segment;

allowing said first hot-melt adhesive to solidify to form a bordered rug;

adhering a unitary carpet backing to a back side of said bordered rug wherein said carpet backing covers said border carpet segments and said field carpet segment by applying a layer of a second hot-melt adhesive between said back side of said bordered rug and said carpet backing and pressing said carpet backing against said back side of said bordered rug by passing the entire bordered rug between parallel moving runs of two endless belts and pressing said runs toward one another and heating said carpet backing as it passes between said runs, thereby forcing said carpet backing against the back side of said bordered rug and heating said layer of said second hot-melt adhesive as said bordered rug and said carpet backing move within said endless belts, thereby causing said hot-melt adhesive to adhere to said carpet backing and said back side of said bordered rug to form said composite bordered rug.

2. The method of claim 1 wherein heat is applied through said rug backing sufficiently to melt said layer of hot melt adhesive as said belts move adjoining carpet segments and as said pressing is carried out.

3. The method of claim 2 further comprising, applying cooling through said rug backing to set said layer of adhesive while continuing said pressing.

4. The method claimed in claim 1 wherein said second hot melt adhesive is applied by positioning a continuous solid sheet of hot melt adhesive between said carpet backing and said back side of said rug.

5. The method claimed in claim 1 wherein said first hot-melt adhesive has a melting temperature higher than said second hot-melt adhesive and wherein said carpet backing is heated to a temperature less than the melting point of a first hot-melt adhesive but greater than the melting point of said second hot-melt adhesive as it passes between said two endless belts.

6. The method claimed in claim 4 wherein said carpet backing comprises an open weave backing coated with a polymer film whereby said polymer film prevents said second hot-melt adhesive from penetrating said open weave backing.

7. The method claimed in claim 5 wherein said border carpet segments completely surround said field carpet segment.

8. The method claimed in claim 5 wherein said first hot melt adhesive has a melting temperature greater than 350° F.

9. A method of forming a composite bordered rug comprising:

bonding a plurality of border carpet segments to a peripheral edge of a central field carpet segment, each of said border carpet segments and said field segments comprising an upper surface and a carpet backing;

wherein said border carpet segments are bonded to said peripheral edge of said field carpet segment to form a bordered rug;

adhering a unitary carpet backing to a back side of said bordered rug by applying a layer of hot-melt adhesive on said carpet backing and allowing said adhesive to solidify; placing said back side of said bordered rug on said layer of hot-melt adhesive and pressing said carpet backing against said back side of said bordered rug by passing said entire bordered rug between parallel moving runs of two endless belts and pressing said runs toward one another and heating said carpet backing as it passes between said runs, thereby forcing said carpet backing against the back side of said bordered rug and heating said layer of hot-melt adhesive as said bordered rug and said carpet backing move within said endless belts, thereby causing said layer of hot-melt adhesive to adhere to said carpet backing and said back side of said bordered rug to form said composite bordered rug wherein said carpet backing covers said border carpet segments and said entire central field carpet segment.

10. The method claimed in claim 9 wherein said bordered carpet segments are bonded to said central field carpet segment by a high temperature hot melt adhesive.

11. The method claimed in claim 10 wherein said high-temperature hot-melt adhesive has a melting temperature higher than said layer of hot-melt adhesive and wherein said carpet backing is heated to a temperature less than the melting point of said high-temperature hot-melt adhesive but greater than the melting point of said layer of hot-melt adhesive as it passes between said two endless belts.

12. The method claimed in claim 11 wherein said carpet backing comprises an open weave backing coated with a polymer film whereby said film prevents said layer of hot-melt adhesive film from penetrating said open weave backing.

* * * * *